Feb. 17, 1948.  W. H. STEWART ET AL  2,435,985
ELECTROMAGNETIC APPARATUS FOR DETECTING FLAWS IN SUSPENDED PIPE
Filed Aug. 12, 1942  2 Sheets-Sheet 1

WITNESS:

INVENTORS
William H. Stewart
John W. Millington
BY
ATTORNEYS.

Patented Feb. 17, 1948

2,435,985

UNITED STATES PATENT OFFICE 2,435,985

ELECTROMAGNETIC APPARATUS FOR DETECTING FLAWS IN SUSPENDED PIPE

William H. Stewart and John W. Millington, Beaumont, Tex., assignors to Sun Oil Company, Philadelphia, Pa., a corporation of New Jersey Application August 12, 1942, Serial No. 454,500

2 Claims. (Cl. 175—183)

This invention relates to a method and apparatus for detecting flaws in drill pipe particularly adapted to the examination of drill pipe while it is being raised from or lowered into a bore hole.

Due to the strains and impacts to which drill pipe is subjected, it is likely to develop flaws in the nature of cracks which, in some subsequent use, may result in breakage and a difficult and expensive fishing job to remove the lower end of the drill stem and what it carries from a bore hole. In some cases, such flaws may exist in the pipe even prior to its first use. The flaws thus existing may not be visible from the surface of the pipe, and even a crack which might extend to the surface may well be hidden with rust or dirt to be unnoticeable. Accidental thin spots in the interior are also undetectable visually from the surface.

It is a general object of the present invention to provide a method and apparatus for the detection of flaws in drill pipe while it is being lowered into or withdrawn from a bore hole. If a substantial number of the parts of a drill pipe are new and being lowered for the first time, the apparatus may be used for detecting flaws as the drill pipe is lowered into the hole. Generally speaking, however, the pipe has already been subjected to careful examination on the part of the manufacturer, and the primary utility of the present invention resides in the automatic examination of the drill pipe as it is withdrawn from the hole, for example to change the bit after a drilling operation. By the use of the method and apparatus it can, therefore, be ascertained whether a particular section of the drill stem should be omitted in making it up for subsequent drilling because of the possible danger of breakage.

The present invention contemplates the detection of flaws by taking advantage of the fact that these flaws represent non-homogeneous conditions of the pipe from an electrical and/or magnetic standpoint. A crack, for example, will represent a discontinuity in the resistivity characteristics of the pipe, providing a surface of high resistance as compared with the low resistivity of the steel of the pipe. Likewise, such a crack will represent a region of substantially increased reluctance from the standpoint of the pipe's magnetic properties. Detection of flaws in this fashion is not in itself new, and has been applied to the detection of flaws in rails, pipe sections at the point of manufacture, cable sheathing and the like.

The present invention contemplates the arrangement of the apparatus so as to secure uniform and satisfactory results during the irregular motions of a drill pipe occurring as it is lowered into or raised from a bore hole. As such pipe is handled by the derrick mechanism, it is suspended, and because of its large inertia will have a great tendency to swing which would normally create variations in an electrical or electro-magnetic configuration used for detection.

The above indicated and other objects of the invention will become apparent from the following description, read in conjunction with the accompanying drawings, in which.

Figure 1:
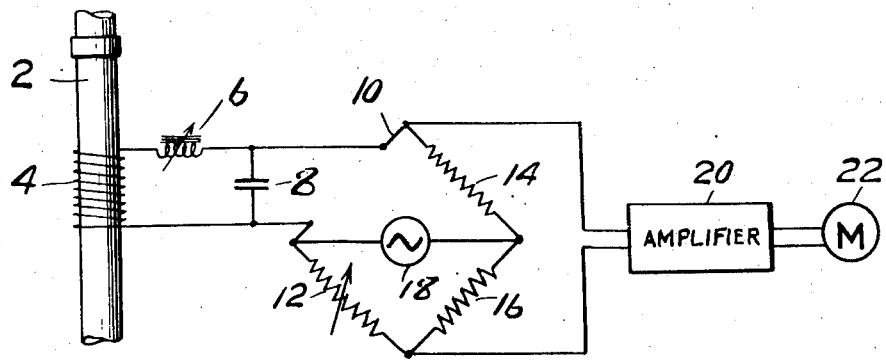
Figure 1 is a diagram illustrating a preferred type of apparatus for detection of drill stem flaws.

The principles upon which the invention is based will be understood from Figure 1. A part of a sectional drill stem is indicated at 2 and will comprise the conventional joints of flush or any other commonly used type. During both lowering and raising, the drill stem is handled through the usual travelling block by the draw works and in general will have a substantial tendency to swing horizontally while suspended. Arranged to surround the drill stem at a fixed vertical level is a coil, diagrammatically indicated at 4, for which it will be evident that the drill stem provides both a core of magnetic material and a transformer secondary having a single turn. The coil 4 is connected in series with an adjustable inductance 6 across a condenser 8, the parallel arrangement of the condenser and coils providing a tunable circuit in the branch 10 of a Wheatstone bridge. The Wheatstone bridge comprises additionally the adjustable resistance 12, suitable fixed resistances 14 and 16 and a source 18 of alternating current. The output of the bridge is arranged to be delivered through an amplifier 20, which may be of suitable vacuum tube type to a meter 22 which is designed to indicate the value of alternating voltage appearing at the output terminals of the bridge. It will be evident that this meter may take very many forms, depending upon the particular arrangement desired. It may be an alternating current meter fed directly from the amplifier, or the amplifier may involve rectification, in which case the meter 22 may be of direct current type with suitable balancing means for zeroizing it in spite of the direct plate current of an output stage of the amplifier. Or the meter may be an oscillograph of mirror or cathode ray type capable of visually indicating the magnitude of the alternating voltage or, if provided with a suitable sweep circuit, the wave form as well.

The principle upon which the apparatus described operates may be understood by assuming that an adjustment of the inductance 6 is so made that with a non-faulty portion of the drill pipe located within the coil 4, the effective self-inductance of the coil, depending upon its own physical characteristics and the characteristics of the pipe from the standpoint of its providing not only a secondary, but also an iron core, in series with the inductance furnished at 6 will produce with the condenser 8 a circuit resonant at the frequency of the source 10. Under such conditions, the combination will act as a pure resistance, and, therefore, by adjustment of the variable resistance 12, the bridge may be balanced so that no alternating voltage will appear at its output terminals.

If after such adjustment a portion of the pipe having a flaw therein enters the coil, the electromagnetic configuration of the combination of the coil and pipe is changed to the end that the terminals of the coil 4 will, in general, present to the tuned circuit an impedance of which both the inductance and resistance will differ from the previous values. In such case, the Wheatstone bridge becomes unbalanced both as to the effective resistance and effective impedance in the branch 10, and an alternating voltage will appear across the output terminals of the bridge to be indicated or recorded by the meter 22, recording automatically taking place if this meter is of a recording type. Even if the effective resistance presented in the branch 10 of the bridge is the same as before, so that this resistance component will balance the resistance 12 in its adjusted condition, there will, nevertheless, invariably appear a reactance component of the impedance which cannot be balanced by a resistance in any arm of the bridge. As a result, the alternating voltage indicative of a fault will appear at the bridge output.

The arrangement is particularly sensitive when the inductance-capacity circuit is tuned to resonance, as above indicated, since a slight departure from the resonant condition is reflected in the way of a substantial change in the impedance of the branch of the bridge.

The passage of joints through the coil will produce a very large unbalance of the bridge, but the passage of these joints will, of course, be noted by an operator or observer or may be noted on an automatically made record so as to be discounted and lead to no errors in interpretation.

Figure 2:
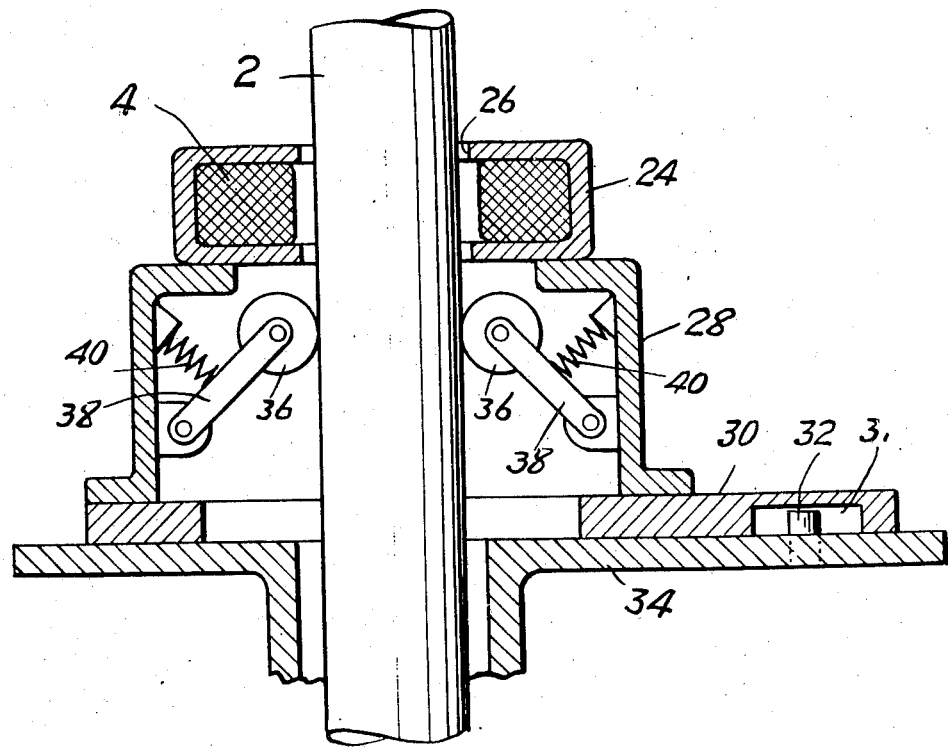
Figure 2 is a diagrammatic sectional view showing the physical form of the flaw detecting apparatus associated with the drill stem.

In order to secure proper results, it is essential that the coil should bear a substantially constant relationship to the axis of the drill pipe. This relationship is not extremely critical, since a core or secondary of the type provided by the drill pipe may be slightly moved within the field of a coil without giving rise to large changes of the electrical configuration. However, reasonable constancy of relationship is required, and for this purpose there may be used an arrangement illustrated in Figure 2.

In this figure, the coil 4 is illustrated as surrounded by a shield 24 formed of transformer iron and arranged to complete partially the magnetic circuit so as to concentrate the flux and thereby magnify the effects of variations in the pipe. The clearance 26 between this shield (and its coil) and the pipe is such as to permit the passage of the type of joints involved in the drill pipe. In the case of external flush pipe, the quite close approach of the shield to the drill pipe is permissible. The unit consisting of the coil and its shield is fixedly mounted on a support 28 carried by a slidable base 30 having a slot 31 embracing a fixed pin 32 extending upwardly from a fixed support 34 on which the base 30 slides and which support may be located above the rotary table. It may, of course, be mounted on the rotary table if suitable slip rings are provided for carrying the currents from the coil to the indicating or recording apparatus. Within the support 28 are located a plurality of rollers 36 carried by pivoted arms 38 and arranged under the pressure of springs 40 to engage the pipe, the rollers yielding for the passage of joints. With an arrangement such as this and with proper tensioning of springs 40, the coil 4 will be forced to a definite position with respect to the axis of the drill pipe, preferably a concentric position if the coil is circular. To secure the maximum accuracy of centering, it is desirable that a substantial number of rollers 36 be used. Three rollers, of course, constitutes a minimum, and if used should be equi-angularly spaced about the axis of the drill pipe. The pin and slot arrangement provides for substantial universal movement of the coil preventing, however, rotation of the entire assembly about the axis of the pipe. By this means, despite the fact that the pipe may swing on its support, the relationship of the coil thereto remains substantially constant, so that erroneous indications of flaws will not occur merely by reason of swinging of the pipe.

Figure 3:
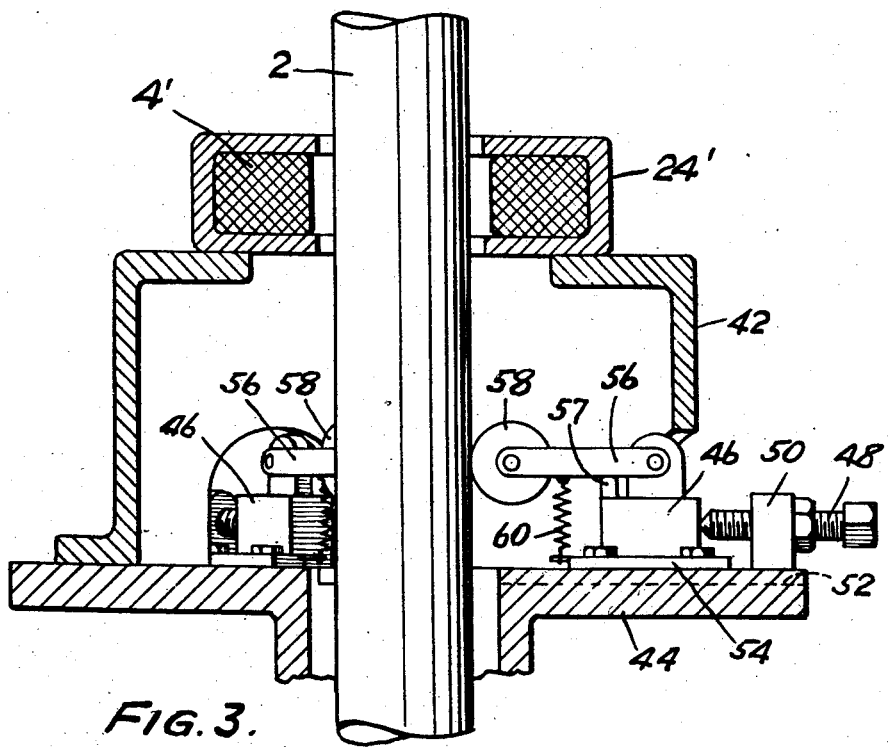
Figure 3 is a similar view of a modified form of apparatus.

Alternatively, an arrangement such as illustrated in Figure 3 may be used, serving to forcibly maintain the pipe 2 in a fixed position with respect to a fixed coil 4' surrounded by an iron sheath 24' corresponding to 24 of the preceding modification. In this case, the coil is carried by a fixed support 42 extending upwardly from a fixed base 44, blocks 46 being arranged to abut adjustable screws 48 threaded through fixed lugs carried by the base 44. The lower ends of the blocks 46 are guided in radial slots 52 and may be clamped in fixed position therein by means of clamping plates 54. Upon each of the blocks 46 is pivoted an arm 56 carrying a roller 58 bearing upon the drill stem. Strong springs 60 urge the arms 56 downwardly against stops 57 to engage the rollers 58 with the drill stem. It will be evident that by suitable relative adjustments of the abutment screws 48 and by the use of sufficiently strong springs 60, an arrangement of three rollers 58 substantially equi-angularly spaced about the axis of the stem will serve to maintain the axis fixed with respect to the axis of the coil 4', the adjustment of screws 48 being such that when the portion of each pipe between joints is passing the rollers they rest on, or substantially on, their stops 57 and either engage or very closely approach the pipe so as to hold it rigidly in definite position. Thus in this case, as in the preceding one, erroneous conclusions as to flaws are avoided by preventing relative motion in a horizontal direction between the axis of the drill stem and the coil. The rollers are, of course, free to yield upwardly to pass joints, thereafter immediately coming back to holding position. With this arrangement, measurements are made only as the drill stem is raised.

Figure 4:
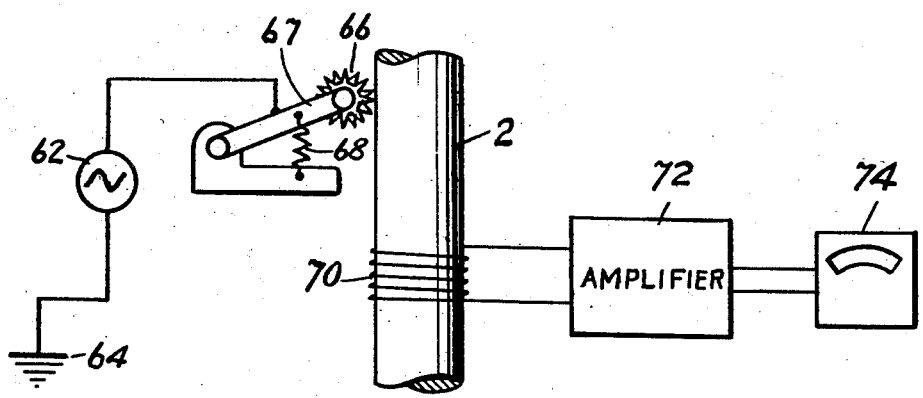
Figure 4 is a diagram similar to Figure 1, but showing an alternative apparatus for the detection of flaws.

In Figure 4 there is shown another arrangement which may be used for the detection of flaws. In this case, a supply 62 of alternating current capable of delivering a heavy current (being, for example, a transformer of the type used for delivery of such heavy currents as are involved in welding) has one terminal connected to ground at 64 and its other terminal to a pivoted arm 67, carrying a pointed wheel having sufficient points to make good continuous electrical contact with the drill stem 2 by digging into and through any dirt or scale thereon, a strong spring 68 serving to insure proper electrical contact. By avoiding variations in the contact at this point, a substantially constant current will flow through the drill pipe to the ground and through the region circumscribed by the coil 70 by reason of the extended ground furnished by the contact between the drill stem and the mud within, or the walls of, the hole. The coil 70 may take the physical form of the coils 4 or 4' previously described and should also be so mounted as to be constantly in the same relationship with the axis of the drill stem. Connected to the coil 70 is amplifier 72 arranged to feed a meter 74 which may be of any of the types previously described. The heavy current which flows through the pipe will induce a current in the coil 70 which acts as a secondary and so long as the portion of the pipe passing through the coil is homogeneous, a voltage of a definite amount will appear across the secondary terminals. However, if a flaw appears, there will be a variation in the distribution of the current in the pipe as well as in the effective mutual inductance between it and the coil, so that variation in the voltage will appear, giving rise to a change in the reading of the meter. In this case, also, due account will be taken of the passage of joints which will, of course, cause very considerable deviations of the meter indication from normal.

It will be obvious that the principles of the invention may be carried out in still other fashions without departing from the invention as defined in the following claims.

What we claim and desire to protect by Letters Patent is:

1. Apparatus for detecting flaws in suspended pipe comprising a coil surrounding said pipe, means for maintaining said coil and the axis of the pipe in substantially constant relationship during vertical movement of the pipe despite variations in pipe diameter throughout regions of greater extent along the pipe than said apparatus, means for causing current to flow in the portion of the pipe within said coil, and means for measuring the effect of such current upon the coil.

2. Apparatus for detecting flaws in suspended pipe comprising a coil surrounding said pipe, means for maintaining said coil and the axis of the pipe in substantially constant relationship during vertical movement of the pipe despite variations in pipe diameter throughout regions of greater extent along the pipe than said apparatus, means for passing a current lengthwise of the pipe through the region within said coil, and means for measuring currents induced in the coil by the first mentioned current.

WILLIAM H. STEWART.
JOHN W. MILLINGTON.

REFERENCES CITED

The following references are of record in the file of this patent:

UNITED STATES PATENTS

| Number | Name | Date |
|---|---|---|
| 890,085 | McCann et al. | June 8, 1908 |
| 1,933,547 | Drake et al. | Nov. 7, 1933 |
| 1,459,970 | Burrows | June 26, 1923 |
| 2,186,826 | Edgar | Jan. 9, 1940 |
| 2,194,229 | Johnston et al. | Mar. 19, 1940 |
| 1,907,864 | Perry | May 9, 1933 |